(No Model.)
W. D. SUNDERLIN.
PRUNING IMPLEMENT.
No. 483,588. Patented Oct. 4, 1892.
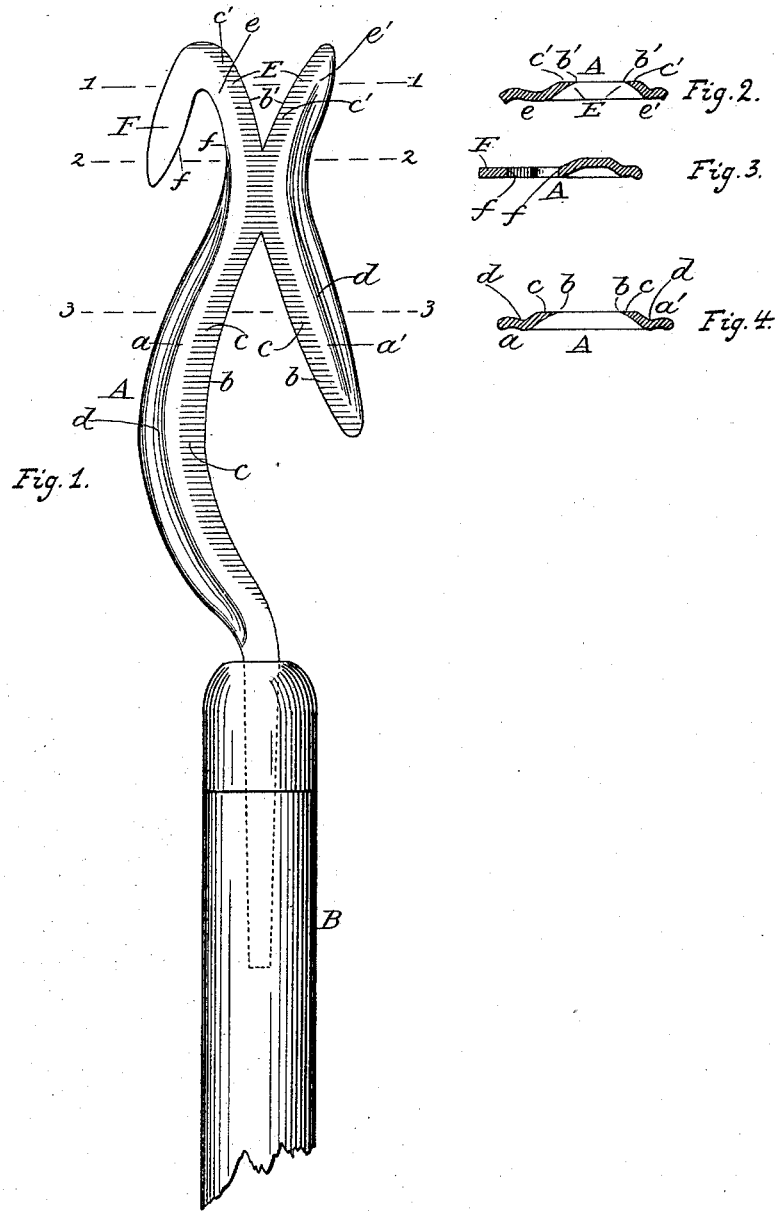

UNITED STATES PATENT OFFICE.

WILLIAM D. SUNDERLIN, OF GREEN ISLAND, NEW YORK.

PRUNING IMPLEMENT.

SPECIFICATION forming part of Letters Patent No. 483,588, dated October 4, 1892.

Application filed May 13, 1892. Serial No. 432,841. (No model.)

*To all whom it may concern:*

Be it known that I, WILLIAM D. SUNDERLIN, a citizen of the United States, residing at Green Island, in the county of Albany and State of New York, have invented certain new and useful Improvements in Pruning Instruments; and I do hereby declare the following to be a full, clear, and exact description of the invention, such as will enable others skilled in the art to which it appertains to make and use the same.

My invention relates to improvements in pruning-knives; and it consists in a pruning-knife having the elements and parts hereinafter described, and specifically set forth in this specification.

The objects of the improvements in this invention are to provide a pruning-knife having a bifurcated cutting-blade in which the branches of the blade have their cutting-edges projected out from the plane of the body of the blade, so that one border side of the cutting-edge will be inclined while the opposite border side of the edge will be on a plane above the surface of the side it is projected above and be calculated to be ground for sharpening the edge without grinding or wearing away the body of the knife; also, to provide a duplex cutting-blade by which stems, twigs, or branches of bushes, trees, or plants may be cut at will by either pulling the knife or pushing it, the knife having its cutting-edges projected out from the plane of the surface of one side thereof, so that a border side of the cutting-edges may be ground for sharpening the said edges without wearing the body of the cutting-blade away; also, to provide in a pruning-knife dual bifurcated cutting-blades struck in form so as to be ribbed or corrugated for stiffening the body of the knife in its several parts and projecting its cutting-edge above the side of said body so that a border portion of the cutting-edges may be readily ground for sharpening the same, and, finally, providing a bifurcated blade of a pruning-knife with a hook-form device by which the twigs or branches cut by the knife may be readily drawn toward the operator after having been severed from the body from which it grew or from its roots at the ground. I attain these objects by the means illustrated in the accompanying drawings, forming a part of this specification, in which—

Figure 1 is a side view of a pruning-knife embodying the essential features in my invention. Fig. 2 is a cross-sectional view of the same, taken at line 1 in Fig. 1. Fig. 3 is a cross-sectional view taken at line 2 in Fig. 1. Fig. 4 is a cross-sectional view of the same, taken at line 3 in Fig. 1.

The same letters of reference refer to like parts throughout the several views.

In the drawings, A represents the body of the knife, and B is the handle to which the said blade is screwed. This handle may be made with any preferred length, from six inches to ten feet, more or less, as may be required or be advantageous for use, or the handle may be sectional, and be composed of two or more pieces which may be readily connected or disconnected at will for lengthening or shortening the same for use for cutting twigs high up, from branches of trees, or for cutting branches of shrubs or bushes nearer the ground. The body of this blade or knife is preferably made of thin sheet-steel, having with the main branch $a$ the branch $a'$, both integral, the latter projected from the point of union of the said two branches rearward, so as to produce a bifurcated form of knife or a hook-form blade. This body of thin steel is struck in such a form as to be corrugated in direction of the branches $a\ a'$, so as to stiffen the same and also to project the cutting-edges $b$ above the plane of surface of one side of the body of the knife, as shown in Fig. 4. The upper surface $c$, bordering the said cutting-edge $b$, is ground preferably flat, so as to produce a slightly beveled cutting-edge, as shown in said Fig. 4, which edge will be above the plane of the depression $d$ of the corrugation and in situation in its entire length, to be sharpened by grinding down the upper border-surface $c$ sufficiently to sharpen the edges, as may be required from time to time. By means of these branches $a\ a'$ constructed as described the edges may be readily sharpened from time to time, and the instrument be made available for severing the small twigs or branches by pulling the knife when the piece to be severed is entered between the branches of the same.

With branch $a$ of this knife is shown a continuation $e$, which is integral with said branch, and integral with this continuation $e$ and branch $a$ is the branch $e'$, which branch $e'$ and continuation $e$ form a bifurcated knife-blade E. The portions $e\ e'$ of this bifurcated knife E is stiffened by being corrugated in directions of length and so as to throw the cutting-edges $b'$ above the plane of the surfaces of the bodies of the portions or branches $e\ e'$. The upper surface $c'$, bordering the cutting-edges $b'$ of this blade E, is ground preferably flat, as shown in Fig. 2, and when the said cutting-edges $b'$ are dull they may be readily sharpened by grinding the flat border portion $c$ down sufficiently for that purpose. By means of this bifurcated blade E branches and twigs of bushes and trees may be readily cut by the operator guiding the blade to its reception of the twig or branch between the branches $e\ e'$ of the same and then pushing the blade forwardly until the twig or branch has been severed from its root or body or limb it grew from.

F is a hook formed of an extension of the metal of this knife turned back on the branch $a$ or its continuation $e$ toward the handle B of the knife. This hook has the edges $f$ of its members plain and without cutting-edges for severing twigs. By means of this hook the twigs and branches severed from a clump of bushes or from among many branches of a tree may, after being severed, be readily grasped and drawn away by the operator from a lodgment among the standing or remaining twigs or branches.

This pruning-knife will be found to be a convenient instrument for thinning out bushes or vines of the blackberry, raspberry, gooseberry, and other berry bushes, as by it the operator may operate this knife by alternately pushing and pulling, or by thrusting the blade E forward against a twig or branch, which may be in situation to prevent the bifurcated knife A from being operated by pulling to cut said twigs or branches, while the knife A may be operated to cut the twigs or branches which may be in situation to prevent the blade E being used effectively for the same purpose. By means of the hook F the severed twigs or branches may be reached and grasped by the operator without necessitating him taking them in his fingers and be drawn out from the live or remaining branches or twigs of the clump of bushes or tree in which the severed one would naturally lodge. By an elevation of the cutting-edges of the several members or branches of this instrument above the plane of the bodies of the same the said edges may be readily sharpened.

Having described my invention, what I claim, and desire to secure by Letters Patent, is—

A pruning instrument capable of operation when pulled or pushed, formed by the combination, with the handle B, of the bifurcated knife A and bifurcated blade E, made integral with each other from thin steel and having their respective members or branches corrugated in direction of their length, and their respective cutting-edges $b$ and $b'$ projected above the plane of the upper surfaces of the bodies of their respective parts and bordered at their upper side by flattened portions $c\ c'$, respectively, substantially as and for the purposes set forth.

In testimony that I claim the invention above set forth I affix my signature in presence of two witnesses.

WILLIAM D. SUNDERLIN.

Witnesses:
CHARLES SELKIRK,
A. SELKIRK, Jr.